United States Patent [19]
McCullough

[11] 3,756,025
[45] Sept. 4, 1973

[54] HANDLING MEANS FOR SLOT FORMERS
[75] Inventor: Edward E. McCullough, Brigham City, Utah
[73] Assignee: Thiokol Chemical Corporation, Bristol, Pa.
[22] Filed: July 14, 1971
[21] Appl. No.: 162,543

[52] U.S. Cl. ............... 60/255, 60/39.47, 102/102
[51] Int. Cl. ............................................. F02c 3/26
[58] Field of Search ............... 60/39.47, 253, 255; 52/125, 126; 102/102

[56] References Cited
UNITED STATES PATENTS
3,492,815  2/1970  McCullough ............... 60/39.47
3,230,281  1/1966  Carroz ....................... 102/102
2,772,560  12/1956  Neptune ..................... 52/125
3,031,841  5/1962  Williams et al. ............. 60/39.47
3,377,956  4/1968  Emerson ..................... 102/102

Primary Examiner—Clarence R. Gordon
Assistant Examiner—Robert E. Garrett

[57] ABSTRACT

In slot formers for solid propellant rocket grains, of the type wherein a disk of propellant is equipped with ribs on one side to provide a radially extending slot between forward and aft components of a solid propellant rocket grain, a rigid reinforcing frame embedded in the propellant disk is provided with loops that extend beyond the surface of the disk to serve as handling means therefore.

3 Claims, 7 Drawing Figures

PATENTED SEP 4 1973　　　　3,756,025
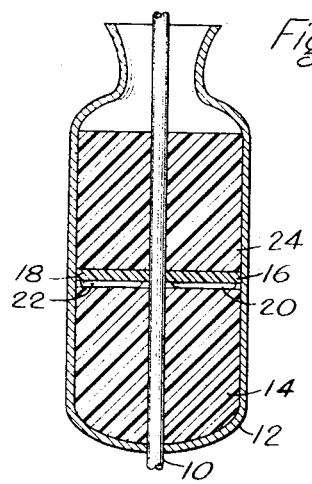
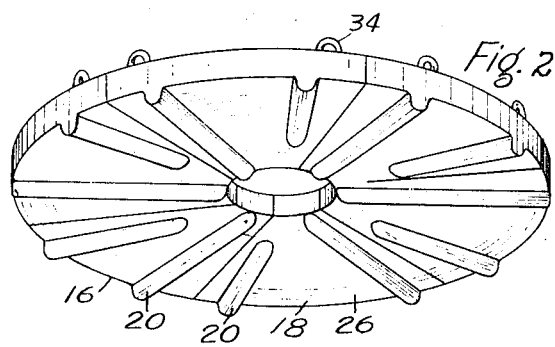
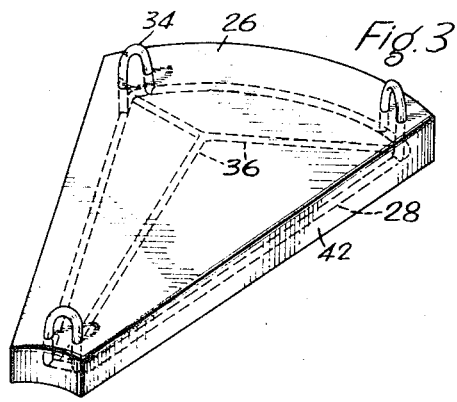
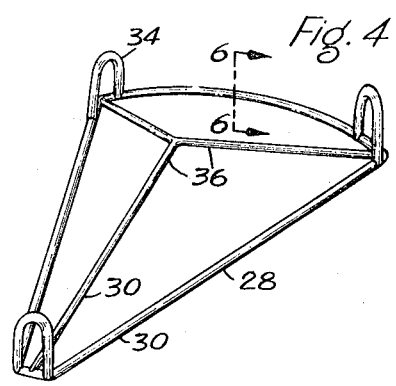
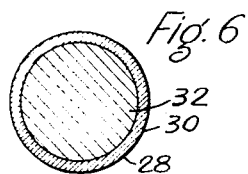
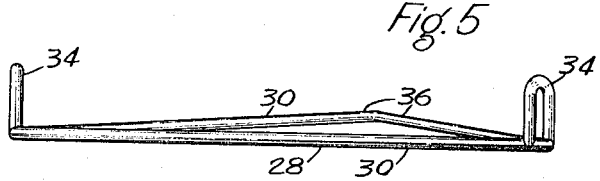
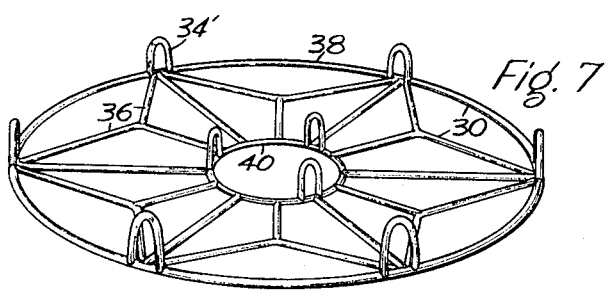
INVENTOR.
Edward E. McCullough
BY Edward E. McCullough
AGENT

HANDLING MEANS FOR SLOT FORMERS

CROSS REFERENCE TO RELATED APPLICATIONS

This invention is related to that of patent application Ser. No. 622,171, filed Mar. 10, 1967 (Now U.S. Pat. No. 3,492,815) titled "Means for Forming Radial Slots in Solid Propellant Grains," by E. McCullough.

BACKGROUND OF THE INVENTION

This invention relates to means for forming radially extending slots in solid propellant rocket grains. In particular, it relates to such means wherein a solid propellant disk equipped with spacing means on one side provides a radially-extending slot between forward and aft components of a solid propellant grain in a rocket motor. The invention herein described was made in the course of or under a contract with the U.S. Air Force.

The solid propellant grain design for rockets wherein a relatively small, longitudinal, cylindrical combustion chamber intersects a radial slot has a number of advantages over the older configurations for solid propellant grains. Such a design not only permits a higher loading density of propellant in a rocket motor case, but also it insures that all of the propellant in the rocket motor case will contribute to useful thrust when burned. In addition, when used for very large rocket motors, it does not require the huge, expensive and difficult-to-remove mandrels that have been previously used. Creation of the radial slot, however, was technically difficult for a long time and required elaborate equipment. Although the invention set forth in the patent cited above solved these problems to a considerable extent, installation of that invention in a rocket motor grains is somewhat difficult for very large rocket motors. That invention consists essentially of a disk of cured propellant equipped on one side with spacers. When installed between forward and aft components of a solid propellant grain, it provides a radial slot created by the spacers. The side of the disk opposite the spacers is bonded to the aft component of the propellant grain. In very large rocket motor cases, this propellant disk is installed in wedge-shaped sections, which can be lowered into the rocket motor case rather inconveniently.

SUMMARY OF THE INVENTION

The present invention, which overcomes this disadvantage in the prior art, consists essentially of a specially shaped, rigid reinforcing frame embedded in the propellant disk and having loops thereon that extend beyond the surface of the disk to provide handling means therefor. This frame, although relatively rigid, is made to be completely consumable at about the same rate as the propellant itself.

Objects of the invention are to provide means whereby such slot formers may be conveniently installed in a rocket motor and to provide such means that will permit handling of the propellant disk or sections thereof without damage to the propellant. Important features of the invention are that the reinforcing frame is completely consumable and that it contributes not only to the strength of the propellant disk itself but its handling loops also contribute to its mechanical integrity with the aft component or the propellant grain.

Other objects and advantages of the invention will become apparent as the following detailed description is read with reference to the accompanying drawings, wherein the same parts are designated by identical numbers throughout the disclosure.

BRIEF DESCRIPTION OF THE DRAWINGS

FIG. 1 is a longitudinal section showing the invention installed in a typical rocket motor;

FIG. 2 is a perspective view of the invention;

FIG. 3 is a perspective view of a section of the invention as shown in FIG. 2, showing the side thereof opposite the spacers and showing the reinforcing frame;

FIG. 4 is a perspective view of the reinforcing frame removed from the propellant disk;

FIG. 5 is a side elevation of the frame shown in FIG. 4;

FIG. 6 is a cross-section of the frame taken on line 6—6 of FIG. 4; and

FIG. 7 is a perspective view of a frame for supporting the one piece disk.

DESCRIPTION OF THE PREFERRED EMBODIMENTS

The present invention is essentially an improvement on the invention in the patent cited above. The invention described in that patent is a means for forming radially extending slots in solid propellant rocket grains. A small diameter, cylindrical mandrel 10 is positioned centrally in a rocket motor case 12, which is then partially filled with an uncured rocket propellant to form the forward grain component 14. This forward grain is then subjected to elevated temperatures for a time sufficient to solidify the propellant. The slot former 16 is then lowered into the case 12 and comes to rest on the aft surface of the forward propellant grain 14. This slot former 16 is essentially a support disk 18 made of the same kind of propellant as the forward grain 14 and having spacers 20 molded on its underside integrally with the disk 18. These spacers 20 create the desired radially extending slot 22 between the forward grain 14 and the support disk 18. The aft propellant grain component 24 is then poured on top of the support disk 18 and subjected to a heat treatment until it too is solidified. The central mandrel 10 is then removed and the propellant grain is complete.

According to the present invention, the support disk 18 may be divided into wedge shaped segments 26 for easier handling in the case of very large rocket motors. Each segment 26 is strengthened by a reinforcing frame 28 embedded therein, as shown in FIGS. 4, 5, and 6, the reinforcing frame 28 is constructed of interconnected rods made of fiberglass tubing 30 filled with solid propellant 32. Each frame 28 is triangular and has loops 34 extending upwardly at right angles to the plane of the frame 28. As shown in FIG. 3 these loops 34 extend above the upper surface of the support disk segment 26. Three radially connected arms 36 extend to the corner of each frame 28 to impart futher strength and rigidity thereto. The radial arms 36 are constructed in the same manner as the remainder of the frame 28 and are integrally connected therewith, as are the loops 34. The preferred solid propellant used for filling the tubes 30 and for the forward grain 14 and the aft grain 24 is all of the same type and is fully described in the cited patent. In making the frame 28, the fiberglass tubes 30 are filled with the uncured propellant 32 and are then subjected to the same heat treatment as are the propellant grains 14 and 24 to solidify the propellant therein.

Manufacture of the fiberglass tubing is well-known in the art. It may be made by a method such as winding strips of fiberglass cloth on a mandrel, filling the fiberglass with a polyester resin, curing it to hardness, and removing the mandrel. Care should be taken that a considerable percentage of the fibers are longitudinally oriented to impart axial strength.

As shown in FIG. 7, the frame 38 for supporting the propellant disk 18 may be all in one piece and is constructed in a manner very similar to that already described. In this case, the preferred configuration is hexagonal having loops 34' extending from the corners thereof and from the circular center 40.

To install the slot former 16 into a vertically positioned rocket motor, each segment 26 is lowered in turn onto the surface of the cured forward propellant grain 14 by cables passing through the loops 34. The cables, not shown, are coated with teflon (polytetrafluoroethylene), as are the loops 34 and 34' to avoid excessive heat caused by friction. Before lowering each segment 26, its edges may be coated with uncured propellant or other adhesive for bonding it to an adjacent segments 26 and to the inside surface of the rocket motor case 12. The spacers 20 are, of course, on the under side of the slot former 16 when it is installed on the forward grain component 14.

In many cases bonding is not necessary. A one piece slot former 16 may be installed in a similar manner.

An invention has been described that constitutes an advance in the art of manufacturing solid propellant grains for rocket motors. Although the embodiments described have been specific with regard to detail, it should be noted that such details could be altered considerably without departing from the scope of the invention as described in the following claims.

The invention claimed is:

1. In a rocket motor having a case, a forward propellant grain component in the case, an aft propellant grain component, and a slot former interposed between the forward and aft grains made of propellant and having spacers on one side thereof to create a radially extending slot between the forward and aft grain components, the improvement comprising:

a reinforcing frame embedded in the slot former and having loops integral therewith that extend beyond the surface of the slot former propellant to facilitate handling of the slot former, the frame being made of rigid tubes filled with solid propellant to promote consumability thereof.

2. The rocket motor of claim 1 wherein the rigid tubes are made of fiber-glass impregnated with a cured resin.

3. A reinforcing frame for a solid propellant slot former comprising a substantially planar system of interconnected rods made of rigid tubes, comprising fiber glass impregnated with a cured resin, filled with solid propellant; and loops connected thereto, extending substantially perpendicular to the plane of the frame.

* * * * *